United States Patent
Schumacher et al.

(10) Patent No.: US 8,424,294 B2
(45) Date of Patent: Apr. 23, 2013

(54) PROCEDURE FOR REGENERATING AN EXHAUST GAS AFTER TREATMENT SYSTEM

(75) Inventors: Sascha Schumacher, Bietigheim-Bissingen (DE); Manfred Kowalczyk, Leonberg (DE); Martin Reichenecker, Leonberg (DE); Aleksandar Lazarevic, Leonberg (DE); Hermann Koch-Groeber, Stuttgart (DE); Benoit Budiscak, Sachsenheim (DE); Maximilian Fischer, Stuttgart (DE); Danny Jaeger, Stuttgart (DE); Gertjan Kanters, Stuttgart (DE); Sabrina Elsa Schwarz, Moeglingen (DE); Rocco Gonzalez Vaz, Stuttgart (DE); Sven Poettker, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 565 days.

(21) Appl. No.: 12/341,280

(22) Filed: Dec. 22, 2008

(65) Prior Publication Data

US 2010/0154389 A1    Jun. 24, 2010

(30) Foreign Application Priority Data

Feb. 8, 2008 (DE) .......................... 10 2008 008 566

(51) Int. Cl.
*F01N 3/00* (2006.01)

(52) U.S. Cl.
USPC ............... 60/295; 60/274; 60/276; 60/277; 60/286; 701/115; 701/201; 701/213

(58) Field of Classification Search ............... 60/274, 60/276, 277, 285, 286, 295, 297; 701/201, 701/213, 115, 202

See application file for complete search history.

(56) References Cited

U.S. PATENT DOCUMENTS

| | | | | |
|---|---|---|---|---|
| 5,319,930 A | * | 6/1994 | Shinzawa et al. | 60/286 |
| 6,032,461 A | * | 3/2000 | Kinugasa et al. | 60/295 |
| 7,017,337 B2 | * | 3/2006 | Plote et al. | 60/295 |
| 7,028,466 B2 | * | 4/2006 | Kondou et al. | 60/295 |
| 7,845,165 B2 | * | 12/2010 | Satou et al. | 60/295 |
| 8,015,805 B2 | * | 9/2011 | Pfaeffle et al. | 60/295 |
| 8,035,532 B2 | * | 10/2011 | Vosz | 340/932.2 |
| 8,115,612 B2 | * | 2/2012 | Hirano et al. | 340/438 |
| 2003/0135323 A1 | * | 7/2003 | Votsmeier et al. | 701/115 |

FOREIGN PATENT DOCUMENTS

DE    10 2004 005 072    8/2005
GB    2393404 A    *    3/2004

* cited by examiner

*Primary Examiner* — Binh Q Tran
(74) *Attorney, Agent, or Firm* — Merchant & Gould P.C.

(57) ABSTRACT

Procedure for regenerating an exhaust gas after treatment system, especially a particle filter, of a combustion engine that is arranged in a motor vehicle, with regeneration cycles that are controlled by a control unit, whereby the control unit is provided with information data regarding the route and whereby the regeneration cycles are controlled with regard to the information data, is thereby characterized, in that the information data that regards the route contains driver specific information data.

18 Claims, 1 Drawing Sheet

PROCEDURE FOR REGENERATING AN EXHAUST GAS AFTER TREATMENT SYSTEM

CROSS-REFERENCE TO RELATED APPLICATIONS

This application claims foreign priority to German Application Serial No. 10 2008 008 566.9, filed Feb. 8, 2008, the disclosure of which is hereby incorporated by reference in its entirety.

TECHNICAL FIELD

The invention concerns a procedure for regenerating an exhaust gas after treatment device, especially a particle filter of a combustion engine that is arranged in a motor vehicle with regeneration cycles that are controlled by a controlling device, whereby information data regarding the route is sent to the controlling device and whereby the regeneration cycles are controlled with regard to the information data.

BACKGROUND

Such a procedure is known for example from DE 10 2004 005 072 A1.

Reciprocating piston internal combustion engines, which are controlled and regulated electronically by an engine control signal, basically develop pollutants in the form of nitrous gases and particles during the conversion of the chemically connected fuel energy into heat.

In order to filter the particles from the exhaust gas, such combustion engines are provided with particle filters in the exhaust gas system, in which the emitted particles are stored. A high percentage of these particles is combustible, especially particles based on carbon. These are generally termed as soot. After a specific operating time a regeneration of the particle filter is necessary while the stored particles are oxidized. During this process heat is released. This heat release during the regeneration phases muss be controlled and regulated, because of temperature peaks in the particle filter that could otherwise occur and which can have a negative impact on the stability and the overall functioning of the particle filter or even destroy it. For that reason it has to be made sure that a certain inlet temperature of the exhaust gas into the particle filter for the oxidation of the particles is set. For this purpose measures that raise the exhaust gas temperature are provided, for example a postponement of the injection beginning of the main injection to late or the additional fuel injection in the same working cycle after the main injection as so called after injection. Furthermore after initiating the regeneration specific engine operation points in the course of the regeneration shall not be started anymore according to the construction of the exhaust gas after treatment system. During the thermal regeneration of diesel particles the transition into idle or boost operation for example, during which the motor vehicle is not driven by the engine, but rolls on a descent for example due to the conversion of potential into kinetic energy, is harmful to the soot combustion directly after beginning the regeneration or can be even damaging for the system at a very highly loaded filter.

Therefore the procedure that is known from DE 10 2004 005 072 A1 takes advantage of the information data regarding the route for controlling the regeneration cycles, in order to avoid in an anticipatory strategy, that for example a regeneration process of a soot particle filter that lasts over several minutes has to be ended due to adverse engine operating parameters or when it could come to a damage of the after treatment system. It can also be avoided by including the information data that characterizes the route for example, that a regeneration takes place for example in a tunnel, since the bad exhaust gas values of the combustion engine that are usually connected with the regeneration are undesired in a tunnel.

But also at this procedure it cannot be avoided completely that operating statuses of the combustion engine and the motor vehicle occur, which are harmful for a regeneration of the diesel particle filter. Thus for example driving statuses can occur, which do not allow a regeneration or which make an abortion of a regeneration necessary, for example when the vehicle is moving with a higher speed on the autobahn, a driving status, which principally allows a regeneration, but this driving status is abruptly ended by the driver, for example because of a traffic jam.

In systems that are known from the state of the art usually a message occurs in a display in the instrument panel as soon as the system gets into critical statuses that are pre-programmed and stored in the control unit, for example the message to see a mechanic or a hint to seek driving conditions with higher speed.

The invention is based on the task to improve a procedure for regenerating an exhaust gas after treatment system according to the category in such a way, that negative impacts on the exhaust gas after treatment system and the combustion engine are further minimized by complying with exhaust gas values that are as good as possible and by optimizing a regeneration of the exhaust gas after treatment system, whereby also the driving statuses are mostly considered that allegedly cannot be detected and that are harmful for the regeneration.

SUMMARY

This task is solved by a procedure for regenerating an exhaust gas after treatment system according to the initial description, whereby the information data regarding the route covers driver specific information data. Regarding this invention driver specific data means that driving habits, driving cycles, driving routes and similar of the driver of the motor vehicle are considered. Put in other words, it means that the information data regarding the route also covers driver specific information data, which allow certain predictions about possible or impossible regeneration phases.

Thus driving routes that have been used frequently by the driver can be assigned to him, as for example routes to work, whereby these routes are marked by a characteristic topography, for example ascents, descents and similar and by characteristic routes. Characteristic route profiles and characteristic driving habits can be also assigned to a driver, for example whether he drives with a higher speed often or not and when this is the case and similar.

The basic idea of the present invention is to control the regeneration cycles depending on theses driver specific information data in such a way that a regeneration of the exhaust gas after treatment system is achieved that is optimal and especially avoids damaging effects on the exhaust gas after treatment system and on the combustion engine.

Subject matter of the present invention are also a computer program as well as a computer program product with a program code, which is stored on a machine readable media, for implementing the procedure.

Further advantages and advantageous embodiments of the procedure are subject matter of the subclaims that depend on claim 1.

Thus for example one advantageous embodiment of the procedure provides that the driver specific information data can be entered into an input device by the driver before starting.

The driver can enter the planned route in such a case. This can happen for example also by entering a destination into a navigation system or similar. By this input driving cycles that are able to regenerate can be determined virtually a priori depending on the route and the regeneration cycles can be implemented correspondingly in a later driving cycle.

At another advantageous embodiment of the invention it is provided that driver specific information data is determined by comparing current data, which characterizes the driving route with saved data, which characterizes the driving route. By such a comparison it can be determined, whether the driver moves the vehicle on a for example already saved route. As long as driving cycles exist on this route, in which regeneration cycles are possible, these can be implemented in the presence of these driving cycles in a very advantageous way. Thereby for example regeneration abortions can be avoided.

Preferably the driver specific information data is detected and stored for this purpose during several driving cycles, whereby very advantageous mass storage, for example a hard drive is used, in order to save a large number of driver specific information data that characterizes the driving cycles, which will be used later for the comparison. The comparison advantageously takes place by neuronal networks, which are especially applicable for a pattern detection and thus allow to detect corresponding driving patterns very advantageously and very quickly.

By this comparison exhaust gas critical driving conditions on the one hand and routes that allow regenerations on the other hand can be virtually predicted and thus regenerations can be avoided or implemented.

A very advantageous embodiment provides that the driver specific data can be recalled after identifying identification means that are associated with the driver, especially a code, which is preferably stored in a storage that is associated to a key. This has the advantage that for example different drivers that use the same vehicle can be recognized and thus driver specific information data can be determined a priori. Furthermore it can be provided that the information data are provided with data from a global positioning system, a traffic telematics system, a route planner and/or a navigation system.

In order to keep the control technological effort low, an advantageous embodiment provides that the information data is extracted data from old and new driving routes with the aid of a controlling device or an upstream arithmetic unit. An advantageous measure of the control strategy is to determine in the controlling device depending on the information data and especially on the driver specific information date, when a regeneration cycle takes place. Another advantageous measure of the controlling strategy is to determine in the controlling device depending on the information data, whether a regeneration process that is provided due to a regeneration demand of an exhaust gas after treatment system is preponed or postponed and to modify the regeneration cycle depending on this determination result if necessary.

Alternatively or additionally it can be provided to determine in the controlling device depending on the information data, whether a modified regeneration procedure for example a regeneration process or regeneration phase is implemented. Different modified regeneration processes and therefore also regeneration cycles can be determined for example by a current calculation corresponding with a modeling or saved and taken from the storage due to specific criteria for implementing the regeneration.

The information data or the driving route data are edited according to an advantageous measure and sent to the controlling device by a bus. In doing so relevant data can be sent for example over a CAN-bus that is available in principle.

Data about ascents and/or descents and/or exhaust gas critical routes and/or traffic jams or other events that influence the drive are preferably provided as additional information data, which have a positive impact on the controlling strategy.

To optimize the procedure it is provided for example that during an ascent the higher temperature of the combustion engine is involved for a regeneration process and/or that at an upcoming descent or at another exhaust gas critical route a regeneration process is postponed, preponed and/or shortened.

BRIEF DESCRIPTION OF THE DRAWINGS

Embodiments of the invention are shown in the drawings and further explained in the following description.

DETAILED DESCRIPTION

Figure 1:
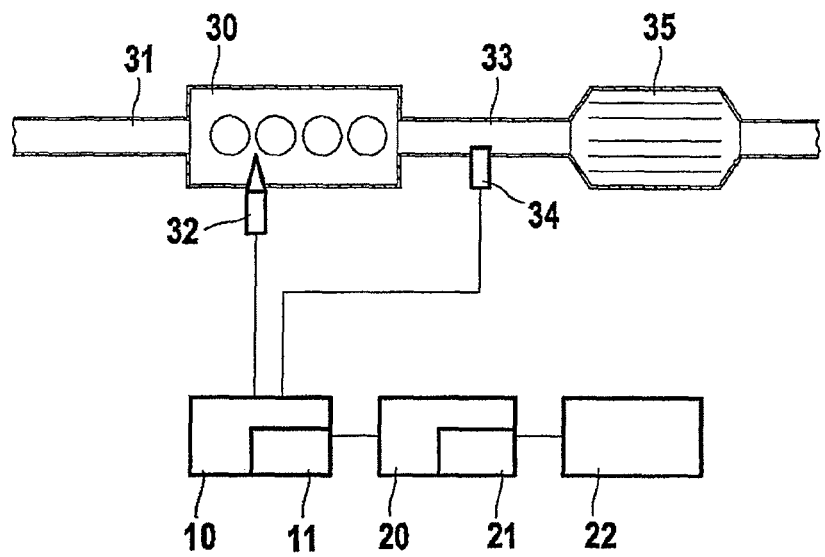
FIG. 1 shows a schematic description of a combustion engine with an exhaust gas after treatment system.

A combustion engine 30 with an exhaust gas treatment system 35 that is shown in FIG. 1 is controlled by a control 10, for example a control unit. The combustion engine 10 provides an air inlet duct 31, through which a combustion mixture is lead. The fuel metering can take place cylinder-specifically over injection nozzles 32, whereby only one of them is shown symbolically as injection nozzle 32. The fuel amount is thereby determined by the control unit 10. The exhaust gas is sent from the combustion engine 30 of an exhaust gas after treatment system 35, especially an exhaust gas purification system, which can for example also provide a particle filter and/or a NOx-storage catalyst, through an exhaust gas system 33, to which an exhaust gas recirculation can also be attached. The particle filter can contain an integrated catalyst, which can be provided for purifying the exhaust gas on the one hand and for supporting an exothermic reaction of combustible exhaust gas components for heating the particle filter on the other hand. The oxygen content of the exhaust gas is measured by an exhaust gas probe 34 and send to the combustion engine controlling 10.

Depending on the specific embodiment of the exhaust gas after treatment system 35 a regeneration of the exhaust gas after treatment system 35 can be necessary. This is for example the case with a particle filter or a storage catalyst. The regeneration can be accomplished by additional injections of fuel with the aid of injection nozzles 32 or by other measures on the one hand for increasing the exhaust gas temperature in the case of a particle filter or for providing a possibly necessary reagent for example in the case of a NOx-storage catalyst.

For determining the necessity for regenerating and for controlling the operating parameters of the combustion engine 30 during the regeneration a regeneration controlling 11 is provided in the control unit 10. It sends a signal to the combustion engine controlling 10 for example based on the evaluation of a pressure drop in the exhaust gas after treatment system 35, especially when the exhaust gas after treatment system 35 contains a particle filter, according to the state of the art in order to initiate a regeneration of the exhaust gas after treatment system 35.

After initiating a regeneration specific operating statuses and driving statuses should be avoided, which could damage the exhaust gas after treatment system 35. The transition into boost at a highly loaded particle filter should be avoided for example due to the associated exhaust gas volume flow or due to an improperly high temperature in the exhaust gas treatment system 35 that might occur because of a high oxygen content.

Furthermore special driving modes, as for example pure city traffic, the so-called Paris cycle, have to be avoided, since no regeneration conditions are present in these operating statuses due to a lack of load and volume flow. Idle phases should also be avoided.

If now no optimal regeneration conditions occur over a longer period of time, a message is signaled to the driver, which is shown in a display in the instrument panel, to see a mechanic or driving conditions with a higher speed are demanded.

It is know from DE 2004 005 072 A1 to consider also the information data that concerns the driving route for determining the regeneration cycles in order to improve the regeneration behavior. In doing so ascent and descent routes and similar, which means topographic data that characterize the driving route, that have been detected for example by a GPS-system are also considered. Thus a regeneration can be undertaken for example on an ascent route, where increased exhaust gas temperatures can be expected. But the sole consideration of these information data does not preclude that an ascent will also be aborted, or that an autobahn drive with a higher speed, at which a regeneration is also possible, is aborted, for example because of a traffic jam.

These information data also do not support a conclusion about the driving behavior and the driving habits of the driver that used the vehicle. Therefore the invention provides that driver specific information data has to be considered. This happens with the aid of a route planner 20, which provides an evaluation level 21, which can evaluate the designated driving route with regard as to whether it appears applicable for a regeneration. The route planner 20 can determine this without an intervention of the operating person, which is explained further below. But it is also possible to provide an input and an output unit 22, which is connected to the route planner 20 and which allows to enter driver specific information data. This input and output unit 22 can be realized for example by a screen with an enter option, as it is known for example from car navigation systems, car radios and similar.

The basic idea of the invention is to procure a quasi early diagnosis/prediction system, which allows a regeneration of the exhaust gas after treatment system 35 even in critical driving or engine operating statuses. For this purpose it is provided on the one hand that the regeneration shifted in specific route sections with corresponding driving conditions, in which the exhaust gas temperature exceeds a threshold for oxidizing the particles for example in the case of the regeneration of a particle filter. On the other hand it is provided that a punctual activation of protective measures, as for example limiting the oxygen mass flow before the particle filter, which can occur at boost or idle statuses during a regeneration phase.

It is now provided, depending on each driver, to save route profile in a storage unit, which for example is part of the route planner 20. This way driver specific information data can be considered for the regeneration for the exhaust gas after treatment device 35. Thus identical regularly used routes for example the drive to work or similar, can be considered. Besides the date and the time of the route, which is characteristic for a driving cycle of a driver, further data that characterized the route cycle of the driver are considered, as for example the position, that is preferably determined by a GPS-system, or other parameters that characterize the route, as for example events that are detected by a traffic telematics system or a TMC-system. Further data that has to be considered are parameters as speed, acceleration, engine speed, steer angle, yaw rate, which are detected for example by engine speed differences between the inner curve and outside curve wheels or by sensors of the ABS- or ESP-systems, as well as the ascent or the descent, which can be determined by air pressure sensors.

The data is preferably stored in a control unit 10 that is build in the vehicle or in a mass storage that is build in the route planner 20, for example a hard drive. This way a large number of driver specific information data can be saved. During a current driving cycle these data that characterize the driving cycle can be compared to save data by a neuronal network, which is especially applicable for pattern detection, and thus a regeneration phase can be initiated or not based on the measured route profiles by the route planner 20 and the regeneration controlling 11. Thus a regeneration strategy can be predicted due to the route information and especially the driver specific route information.

Depending on each driver, which can be identified for example by identification means as the entering of a code into the input unit 22 or by entering the code by using a key, which is associate with the driver, the driven route profile are saved in the system. Due to the regular driving of identical routes, for example the drive to work, a statistic basis for frequently used routes is produced. As soon as the vehicle moves the system checks by comparing the already saved routes whether the vehicle is on a familiar route. Therefore critical driving conditions that occur, as for example city traffic, descents or regular traffic jams can be predicted based on the saved routes. Thus it is possible to put an upcoming necessary regeneration of the exhaust gas after treatment system, for example of a diesel particle filter, in a route section, which offers optimal conditions for a complete regeneration. Furthermore specific critical driving statuses during a regeneration as for example a boost or an idle operation can be predicted on this route and necessary protective measures as for example a limitation of the oxygen feed before a particle filter can be initiated in time already before its occurrence.

By the identification in the form of a code or a personal key that is associated with the driver route statistics based on the driver can be created as mentioned and thus the route prediction can be improved by detecting specific route profiles. It is also a special advantage that the saved statistic basis is improved with every new usage of a familiar route and that thereby an accurate description of the profile and the occurring events is always enabled.

Figure 2:
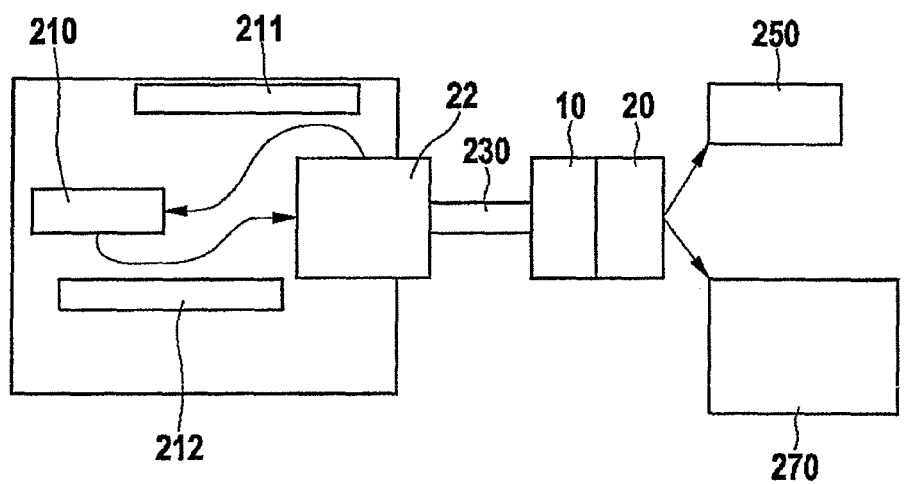
FIG. 2 shows a block diagram for explaining an embodiment of the procedure according to the invention.

In connection with FIG. 2 a possible procedure course is described briefly in the following.

A driver 210 enters corresponding answers 212 to a large number of questions 211 into the input unit 22. For this purpose a corresponding interface is provided in the input and output unit 22, which can also be a code detection of the key. The input and output unit 22 is connected with the route planner 10 over a CAN-bus 230. Depending on the data that has been detected in the route planner 10 a signal is produced to the control unit 20 for a regeneration of the exhaust gas after treatment system 35, for example an injection system 250 controlled or another measure 270 undertaken in order to increase the exhaust gas temperature. In the embodiments shown in FIG. 2 statuses are determined from the beginning, which allow a regeneration, whereby it shall be understood that the planned route is compared to GPS-data or data of a telematics system and similar.

Alternatively it is also possible to develop a regeneration strategy completely independent of the driver. In such a case the driver 210 is replaced by a navigation system, which detects the route. This route will be compared to the data that has been stored in the storage as described above and predictions are taken, which allow a regeneration of the exhaust gas after treatment system 35 in customized driving statuses.

The invention claimed is:

1. A method of regenerating an exhaust gas after treatment system, especially a particle filter, of a combustion engine arranged in a motor vehicle, the method comprising:
controlling a particle filter regeneration cycle with a control unit, wherein the control unit is provided with data comprising of information data relating to a route, and wherein the route information data contains at least a plurality of driver specific data, wherein the driver specific data comprises each of: driving habits, driving cycles, and characteristic driving routes assigned to a particular driver.

2. A method according to claim 1, further comprising entering the plurality of driver specific data with an input device prior to starting a drive.

3. A method according to claim 1, further comprising determining the driver specific data via a comparison of a current set of data that characterizes the route with a saved set of data that characterizes the route.

4. A method according to claim 3, further comprising detecting and saving the plurality of driver specific data during a plurality of driving cycles.

5. A method according to claim 3, further comprising comparing the current set of data and the saved set of data with the aid of a neuronal network.

6. A method according to claim 3, further comprising predicting, via the comparison of the current set of data and the saved set of data, at least one of:
an exhaust gas critical driving condition; and
a route that enables a regeneration process.

7. A method according to claim 1, further comprising providing the plurality of driver specific data via a driver identifying identification, wherein the driver identifying identification is a code preferably saved in a storage associated with a key.

8. A method according to claim 1, further comprising transferring the route information data via at least one of: a global positioning system; a traffic a telematics system; a route planner; and a navigation system.

9. A method according to claim 1, further comprising extracting the plurality of driver specific data from route information data via least one of: the control unit; and an upstream arithmetic unit.

10. A method according to claim 9, further comprising evaluating with the control unit when the particle filter regeneration cycle occurs based on the route information data.

11. A method according to claim 10, further comprising determining whether a particle filter regeneration cycle that is scheduled due to a regeneration demand of the exhaust gas after treatment system is one of: preponed; and postponed, wherein the particle filter regeneration cycle is modified based on the result of the determination if required.

12. A method according to claim 11, further comprising evaluating with the control unit if the modified particle filter regeneration cycle is required.

13. A method according to claim 1, further comprising transferring edited route information data to the control unit via a bus, especially a CAN-bus.

14. A method according to claim 1, further comprising providing with the route information data a plurality of route data selected from a group containing ascent data, descent data, exhaust gas critical route data, traffic jam data, and a plurality of other data concerning events that influence the route.

15. A method according to claim 1, further comprising:
upon an ascent, considering an increased temperature of the combustion engine for the particle filter regeneration cycle; and
upon an upcoming descent or an exhaust gas critical route, establishing an optimization strategy such that the particle filter regeneration cycle is one of: postponed; preponed; and shortened.

16. A control unit comprising a computer program embodied on a machine readable media, to implement, if executed on a computer or a control unit of a combustion engine, a method of regenerating an exhaust gas after treatment system, especially a particle filter, of a combustion engine arranged in a motor vehicle, the method comprising: controlling a particle filter regeneration cycle with a control unit, wherein the control unit is provided with data comprising of information data relating to a route, and wherein the route information data contains at least a plurality of driver specific data, and wherein the driver specific data comprises each of: driving habits, driving cycles, and characteristic driving routes assigned to a particular driver.

17. A control unit comprising a computer program product with a program code saved on a machine readable medium to implement, if executed on a computer or a control unit of a combustion engine, a method of regenerating an exhaust gas after treatment system, especially a particle filter, of a combustion engine arranged in a motor vehicle, the method comprising: controlling a particle filter regeneration cycle with a control unit, wherein the control unit is provided with data comprising of information data relating to a route, and wherein the route information data contains at least a plurality of driver specific data, and wherein the driver specific data comprises each of: driving habits, driving cycles, and characteristic driving routes assigned to a particular driver.

18. The method of claim 1, wherein the driver specific data further includes driving routes frequently used by the driver.

* * * * *